Patented Sept. 16, 1941

2,255,903

UNITED STATES PATENT OFFICE 2,255,903

5,5-DISUBSTITUTED-2,4-THIAZOLIDIONES, AND PROCESS OF MAKING THEM

Horace A. Shonle and Wilbur J. Doran, Indianapolis, Ind., assignors to Eli Lilly and Company, Indianapolis, Ind., a corporation of Indiana No Drawing. Application July 25, 1938, Serial No. 221,232

30 Claims. (Cl. 260—302)

It is the main object of our invention to produce certain 5,5-disubstituted-2,4-thiazolidiones, also called 5,5-disubstituted-2,4-dioxo-thiazolidines, and their salts.

These new thiazolidione compounds both the acids and their salts, have sedative action. When certain members of this series are administered, particularly intravenously, in the form of the sodium salt, however, this sedative action is sometimes accompanied by a stimulative action.

These new thiazolidione derivatives and their salts are represented by the following formula:

(1) 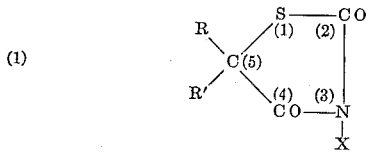

in which R and R' represent hydrocarbon groups which may be alike or different so long as one of them is a primary group and each of which contains from two to six carbon atoms so long as the total is not more than ten and has a carbon atom directly attached to the methylene carbon of the thiazolidione nucleus and to not more than two other carbon atoms, which groups may also be defined as saturated or unsaturated hydrocarbon groups of which at least one is a primary group and the other may be a primary or a secondary or a cyclic group, which have from two to six carbon atoms each, and in which the sum of the carbon atoms of R and R' does not exceed 10; and X represents a member of the class consisting of hydrogen (if the compound is in its acidic form) and (if the compound is a salt) an alkali metal, such as sodium, a stoichiometric equivalent of an alkaline-earth metal, such as calcium, ammonium, mono-alkyl ammonium, dialkyl ammonium, alkanol ammonium, and a stoichiometric equivalent of alkalene diammonium.

The substituents R and R' are capable of considerable variation, of which the following are examples:

Class I
(a) Ethyl.
(b) n-Propyl, isopropyl.
(c) n-Butyl, isobutyl, secondary-butyl.
(d) n-Amyl, isoamyl, 1-methyl-butyl, 2-methyl-butyl, 1-ethyl-propyl.
(e) n-Hexyl, isohexyl, secondary-hexyl, 2-ethyl-butyl.
(f) Cyclo-pentyl, cyclo-hexyl.
(g) Phenyl.

Class II
(h) Allyl, 1-methyl-allyl, 2-methyl-allyl, crotyl.
(i) Cyclo-pentenyl, cyclo-hexenyl.

When R and R' are both of Class I, consisting of saturated aliphatic, cyclic aliphatic, and aromatic groups, these new thiazolidiones and the salts thereof may be prepared by either of two methods, A and B, each of which is variable by the use of obvious chemical equivalents, but each of which involves introducing the substituent groups before closing the ring:

A. Disubstituted halogen (preferably bromo) acetic acids are condensed with thiourea, and the resulting 5,5-disubstituted-2-imino-4-thiazolidones are then converted into the corresponding 5,5-disubstituted-2,4-thiazolidiones by heating with dilute acid;

B. Disubstituted halogen (preferably bromo) acetyl halides, such as the chloride, are condensed with thiourea, and the resulting 5,5-disubstituted-2-imino-4 - thiazolidones are then converted (as in method A) into the corresponding 5,5-disubstituted-2,4-thiazolidiones by heating with dilute acid.

When either or both of R and R' are of Class II, consisting of unsaturated aliphatic groups, these new thiazolidiones and the salts thereof may be prepared by a somewhat different method C, which is also variable by the use of obvious chemical equivalents; but which involves introducing a substituent group or groups after closing the ring, preferably into the intermediate imino-thiazolidone:

C. When one of the substituents R and R' is of Class I, it is introduced as in method A or method B, save that a monosubstituted halogen acetic acid or halogen acetyl halide is used. To introduce the substituent of Class II, or both substituents of Class II if both are of that class, a different procedure is used, as is set forth in detail hereinafter.

In all of these methods A, B, and C, 5,5-disubstituted-2-imino-4-thiazolidones are obtained as intermediates. These intermediates and the final products may be represented by the following general formula:

(2) 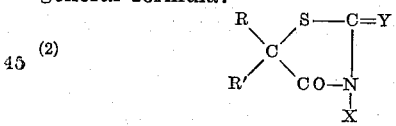

in which R, R', and X have the same significance as before, and Y represents a member of the class consisting of oxygen and the NH group. So far as we are aware, the new intermediate 5,5-disubstituted-2-imino-4-thiazolidones are all new with us with the exception of the one where both substituents are ethyl groups.

We will discuss these several methods and give one or more examples under each.

Method A

A few of the desired disubstituted acetic acids used may have been described, and when available may be purchased. Most of them, however, are new with us. They may be prepared most conveniently by hydrolyzing the corresponding disubstituted malonic esters (as by warming with dilute alkali-metal hydroxide solution), followed by removing the solvent, and acidifying. (Those disubstituted malonic esters are in general known, and in any case may be prepared by known methods.) The disubstituted malonic acid which separates on the acidifying is extracted, as with ether. The ether is then removed, and the residual disubstituted malonic acid is heated under a reflux condenser to a sufficiently high temperature to cause a splitting out of carbon dioxide, usually at about 170° C., to form the corresponding disubstituted acetic acid. This heating is continued as long as gas is evolved. After the evolution of gas has ceased, the disubstituted acetic acid which remains in the vessel is purified, as by vacuum distillation.

We then replace the hydrogen on the α-carbon atom with a halide, conveniently bromine. This is done by converting the disubstituted acetic acids into the corresponding α-bromo-acetic acids by heating them with bromine, following the general procedure given by Clarke and Taylor, Organic Syntheses, collective volume I, p. 108.

In accordance with this procedure we have prepared disubstituted α-bromo-acetic acids, of which the following are examples:

Ethyl-n-propyl-bromo-acetic acid, a liquid which boils at 102–110° C., at about 2 mm., and which is represented by the following formula:

(3) 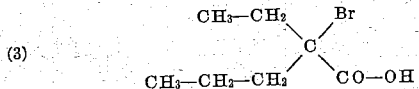

Ethyl-isobutyl-bromo-acetic acid, a liquid which boils at 121–125° C. at about 2.5 mm., and which is represented by the following formula:

(4) 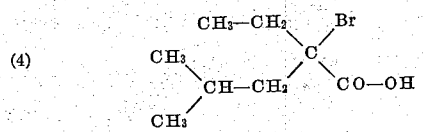

Ethyl-(1-methyl-butyl)-bromo-acetic acid, a liquid which boils at 120–125° C. at about 1 mm. pressure, and which is represented by the following formula:

(5) 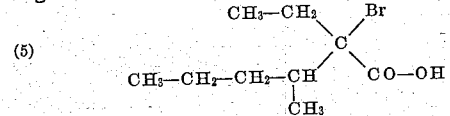

Any others of the various disubstituted bromo-acetic acids where both substituents are of Class I above may be made by this procedure.

We then condense these disubstituted bromo-acetic acids with thiourea, desirably in the presence of alcohol and an alkaline reagent such as sodium acetate, to obtain the corresponding 5,5-disubstituted-2-imino-4-thiazolidones. For example:

5,5-ethyl-(1-methyl-butyl-2-imino-4-thiazolidone

A mixture of 23.7 g. (about 0.1 mol) ethyl-(1-methyl-butyl)-bromo acetic acid, 7.6 g. (about 0.1 mol) thiourea, 3.8 g. (about 0.046 mol) anhydrous sodium acetate, and about 110 cc. absolute ethyl alcohol, are refluxed for about three hours. The alcohol is removed by distillation in vacuo; and the residue, which is crude 5,5-ethyl-(1-methyl-butyl)-2-imino-4-thiazolidone mixed with sodium bromide and hydrobromic acid, is treated with water, and sodium bicarbonate is added until the water is neutral to litmus, to dissolve the sodium bromide and neutralize the hydrobromic acid. The 5,5-ethyl-(1-methyl-butyl)-2-imino-4-thiazolidone, which separates out as a solid at this stage, is filtered, washed with water, and dried. After several recrystallizations from dilute alcohol, it melts at about 229–231° C. (The melting points herein recorded were taken with a short-stem Anschütz thermometer.) It is represented by the following formula:

(6) 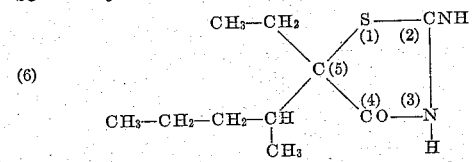

5,5-ethyl-n-propyl-2-imino-4-thiazolidone

This may be prepared in the same general manner as described above, using equivalent proportions. It is obtained as a white crystalline solid melting at about 220–222° C. It is represented by the following formula:

(7) 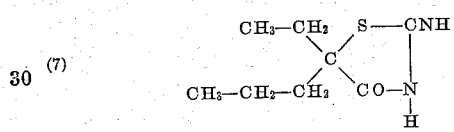

5,5-ethyl-isobutyl-2-imino-4-thiazolidone

This may be prepared in the same general manner as described above, using equivalent proportions. It is obtained as a white crystalline solid, melting at about 225–227° C. It is represented by the following formula:

(8) 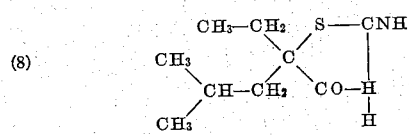

Any others of the various 5,5-disubstituted-2-imino-4-thiazolidones where the substituents are of Class I above may be similarly prepared by this procedure, by condensing the proper disubstituted bromo-acetic acid with thiourea, desirably in the presence of alcohol and an alkaline reagent.

The 5,5-dialkyl-2-imino-4-thiazolidones thus obtained are then treated, by warming with dilute acid, to remove the imino group; to convert them into the 5,5-disubstituted-2,4-thiazolidiones. For example:

5,5-ethyl-(1-methyl-butyl)-2,4-thiazolidione

Four and a half (4.5) grams (0.021 mol) of 5,5-ethyl-(1-methyl-butyl)-2-imino-4-thiazolidone is dissolved in a solution of about 5 cc. of concentrated hydrochloric acid and about 95 cc. of distilled water. This solution is then refluxed for about two hours, or until reaction is complete. During this period of refluxing, insoluble globules of liquid separate; and on cooling these solidify. This solidified material is the crude 5,5-ethyl-(1-methyl-butyl)-2,4-thiazolidione. This solid is filtered off, and washed with petroleum ether, and is found to melt at about 99–100° C. After several recrystallizations from dilute alcohol, and drying, preferably in vacuo, the 5,5-ethyl-(1-methyl-butyl)-2,4-thiazolidione is found to melt at about 105–107° C. It is represented by the following formula:

(9) 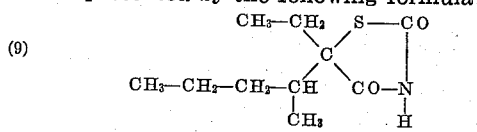

*5,5-ethyl-n-propyl-2,4-thiazolidione*

This may be prepared in the same general manner as described above, using equivalent proportions. The crude new compound separates from the hot acid solution in the form of oily globules. However, on cooling, these oily globules, which are the crude 5,5-ethyl-n-propyl-2,4-thiazolidione, do not readily solidify. This material in oily form is separated from the water, in any suitable manner, and dissolved in a suitable solvent, conveniently chloroform. The chloroform solution is then treated with excess dilute sodium hydroxide, and the mixture stirred until all of the thiazolidione has dissolved in the sodium hydroxide, as the sodium salt. The sodium-hydroxide solution is then separated from the chloroform, and filtered; and the pH is lowered by the addition of acid until it is about 9. Decolorizing carbon is preferably added, and the solution of the sodium salt of 5,5-ethyl-n-propyl-2,4-thiazolidione is filtered clear. Dilute acid is then added until separation of the 5,5-ethyl-n-propyl-2,4-thiazolidione, as an oily substance, is complete. This oily substance is then taken up in a solvent, preferably chloroform, and the chloroform solution is washed free from mineral acid. Then the chloroform solution is dried, as with sodium sulfate, and the chloroform is removed by evaporation; leaving the 5,5-ethyl-n-propyl-2,4-thiazolidione as a residual liquid. It is represented by the following formula:

(10) 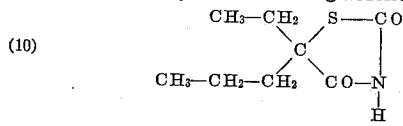

*5,5-ethyl-isobutyl-2,4-thiazolidione*

This may be prepared in the same general manner as described above, using equivalent proportions. Crude 5,5-ethyl-isobutyl-2,4-thiazolidione separates as liquid globules from the hot acid solution, and does not readily solidify on cooling. This crude product is purified as described in the last example. After that purification, the 5,5-ethyl-isobutyl-2,4-thiazolidione is obtained as an oil.

It is represented by the following formula:

(11) 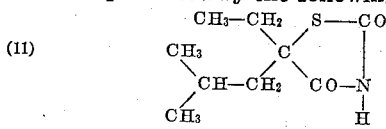

Any others of the various 5,5-disubstituted-2,4-thiazolidiones may be similarly prepared when both substituents are in Class I above.

METHOD B

We may obtain the desired initial disubstituted bromo-acetyl chlorides from the corresponding disubstituted acetic acids, described under method A, by first converting those acids into their chlorides, as by means of thionyl chloride; purifying, as by distillation; and then treating the resulting di-substituted acetyl chlorides with bromine. For example:

We have so prepared ethyl-secondary-butyl-bromo-acetyl chloride, a liquid which boils at 95–100° at about 5 mm., and which is represented by the following formula:

(12) 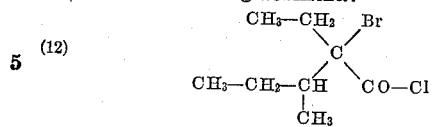

We have also so prepared diethyl-bromo-acetyl chloride, a liquid which boils at 75–80° C. at about 10 mm., and which is represented by the following formula:

(13) 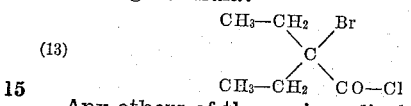

Any others of the various disubstituted bromo-acetyl halides, whether chlorides or other halides although we prefer the chlorides, may be made by this procedure where both substituents are of Class I above.

We then condense these disubstituted bromo-acetyl chlorides with thiourea, to obtain the 5,5-disubstituted-2-imino-4-thiazolidones. For example:

*5,5-diethyl-2-imino-4-thiazolidone*

A mixture of 23 grams (about 0.108 mol) of diethyl-bromo-acetyl chloride and 12 grams (about 0.16 mol) of thiourea is placed in a flask, and warmed if needed to initiate the reaction. The reaction is usually vigorous enough to proceed spontaneously, when once started, but if not there may be further warming. When the reaction is complete, water is added; followed by sufficient alkali, such as sodium hydroxide, to neutralize any halogen acids present.

A precipitate is thus produced, which is crude 5,5-diethyl-2-imino-4-thiazolidone. It is purified by recrystallization, as from dilute alcohol. It melts at about 237–238° C. It is represented by the following formula:

(14) 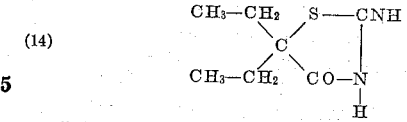

*5,5-ethyl-sec.-butyl-2-imino-4-thiazolidone*

This may be prepared in the same general manner as described above, using equivalent proportions. After recrystallization, it is obtained as a white, crystalline solid melting at about 215–216° C. It is represented by the following formula:

(15) 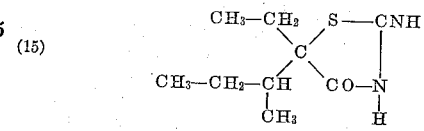

The 5,5-dialkyl-2-imino-4-thiazolidones are then converted by warming with dilute acid, as in Method A, to the corresponding thiazolidiones. For example:

*5,5-diethyl-2,4-thiazolidione*

This is obtained as a white crystalline solid, melting at about 78–78.5° C. It is represented by the following formula:

(16) 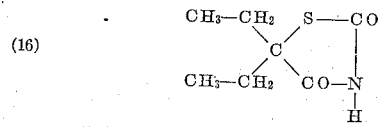

*5,5-ethyl-sec.-butyl-2,4-thiazolidione*

This is obtained as a white crystalline solid, melting at about 70–72° C. It is represented by the following formula:

(17) 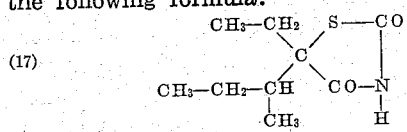

Any other of the various 5,5-disubstituted-2,4-thiazolidiones may be similarly prepared when both substituents are in Class I above.

METHOD C

As already stated, when either or both of R and R' are of Class II, consisting of unsaturated aliphatic groups, Method C is used to introduce the unsaturated group or groups; and is used alone, and to introduce both substituents, if both R and R' are of Class II, but otherwise is used only after first using Method A or Method B to introduce a group of Class I.

When one of the substituent groups is a member of Class I and the other a member of Class II, we proceed as follows:

First we prepare a mono-substituted bromo-acetic or mono-substituted bromo-acetyl chloride (or other halide) in which the substituent is the desired member of Class I, by following the general procedure outlined above under Method A or Method B save that a mono-substituted malonic ester is used instead of a di-substituted one. Then the mono-substituted bromo-acetic acid or mono-substituted bromo-acetyl choride is condensed with thiourea as described above under Method A and Method B for the corresponding di-substituted compounds; to produce the corresponding 5-mono-substituted-2-imino-4-thiazolidone.

This 5-mono-substituted-2-imino-4-thiazolidone is dissolved in a sufficient quantity (preferably a molecular amount) of dilute alkali hydroxide to produce a solution of the sodium salt of that 5-mono-substituted-2-imino-4-thiazolidone. This solution of the sodium salt is treated with somewhat in excess of a molecular proportion of a halide of the desired unsaturated group of Class II (with or without the addition of copper or other catalyst); as, for example, allyl bromide, methyl-allyl bromide, crotyl bromide, cyclo-pentenyl bromide, or cyclo-hexenyl bromide. After some hours, warming and shaking if necessary, the reaction is completed, to produce the desired 5,5-disubstituted-2-imino-4-thiazolidone; which separates, usually as a solid.

The 5,5-disubstituted-2-imino-4-thiazolidone thus obtained, with or without purification as by recrystallization, is then treated to remove the imino group, by the general procedure described above under Method A, to yield the corresponding 5,5-disubstituted-2,4-thiazolidione containing one substituent of Class I and one substituent of Class II.

Examples of products obtained by the foregoing procedure are as folows:

5,5-ethyl-allyl-2,4-thiazolidione
5,5-ethyl-methylallyl-2,4-thiazolidione
5,5-propyl-crotyl-2,4-thiazolidione
5,5-ethyl-cyclohexenyl-2,4-thiazolidione
5,5-phenyl-allyl-2,4-thiazolidione
5,5-propyl-allyl-2,4-thiazolidione When both R and R' are groups of Class II, and thus unsaturated, it is necessary to close the ring before introducing either of them. In that case, we start with 2-imino-4-thiazolidone; which is known.

If the two substituents to be introduced are the same, the 2-imino-4-thiazolidone is dissolved in two mols of dilute alkali hydroxide, such as sodium hydroxide, and treated with somewhat in excess of two mols of a halide (most conveniently the bromide) of the desired unsaturated alkyl group of Class II which is to constitute both of the two substituents, with or without the addition of copper or other catalyst. After some hours, warming and shaking if necessary, the reaction is completed, to produce the desired 5,5-disubstituted-2-imino-4-thiazolidone; which separates, usually as a solid.

If the two substituents to be introduced are different, but both of Class II, the 2-imino-4-thiazolidone is dissolved in one mol of dilute alkali hydroxide; and treated with barely an excess of one mol of a halide (most conveniently the bromide) of the desired unsaturated alkyl group of Class II which is to constitute one of the two substituents, with or without the addition of copper or other catalyst. When this has reacted, after some hours (with warming and shaking if necessary), and with or without purification of the intermediate 5-monosubstituted-2-imino-4-thiazolidone that has been formed, another mol of dilute alkali hydroxide is added to that intermediate, and that is followed by somewhat in excess of one mol of a halide (again desirably the bromide) of the desired unsaturated alkyl group of Class II which is to constitute the other of the substituents. When the second reaction is complete, after such warming and shaking as may be necessary, the resulting 5,5-disubstituted-2-imino-4-thiazolidone separates, usually as a solid.

The 5,5-disubstituted-2-imino-4-thiazolidone thus obtained, whether the two substituents are alike or are different, and with or without purification as by recrystallization, is then treated to remove the imino group, by the general procedure described above under method A, to yield the corresponding 5,5-disubstituted-2,4-thiazolidione containing two substituents of Class II.

Examples of products obtained by the foregoing procedures when both substituents are of Class II, are as follows:

5,5-diallyl-2,4-thiazolidione
5,5-dicrotyl-2,4-thiazolidione
5,5-dimethylallyl-2,4-thiazolidione
5,5-allyl-crotyl-2,4-thiazolidione
5,5-allyl-cyclopentenyl-2,4-thiazolidione

*Properties*

All the 5,5-disubstituted-2-imino-4-thiazolidones contemplated by the present invention are soluble both in dilute alkalies and in dilute acids. While some of them exhibit sedative action in themselves, their main purpose is as intermediates in producing the 5,5-disubstituted-2,4-thiazolidiones, which in general are more effective as sedatives.

All the 5,5-disubstituted-2,4-thiazolidiones contemplated by the present invention are either solids or oily liquids. They are soluble in dilute alkalies, but are insoluble in dilute acids. They have a marked sedative action, especially on oral administration; and that sedative action may or may not be accompanied by side effects. They may be administered directly as obtained, or in the form of the sodium salt or other salts within the class outlined above, or in the form of solutions of such salts.

Alkali metal salts

The sodium salts of these disubstituted thiazolidiones are represented by the following general formula, in which R and R' have the same significance as before:

(18) 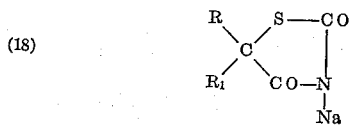

The other alkali-metal salts have the same general formula except for the substitution of the other metal for sodium.

These salts may be prepared as follows: A solution of one molar proportion of the hydroxide or the ethylate of the alkali metal, such as sodium, is added to a suspension or a solution in a suitable solvent, such as alcohol, of one molar proportion of any of the herein-contemplated disubstituted thiazolidiones; which produces the desired salt. If the salt is in solution, the solvent may be removed, as by evaporation under low temperature, until the salt is obtained in a solid form. If the salt is insoluble in the solvent used, it is suitably separated from the solvent and dried.

Sodium salts may be formed of all the disubstituted thiazolidiones given above as examples. A few of those sodium salts are the following:

Sodium salt of 5,5-diethyl-2,4-thiazolidione
Sodium salt of 5,5-ethyl-n-propyl-2,4-thiazolidione
Sodium salt of 5,5-ethyl-isobutyl-2,4-thiazolidione
Sodium salt of 5,5-ethyl-sec.-butyl-2,4-thiazolidione
Sodium salt of 5,5-ethyl-(1-methyl-butyl)-2,4-thiazolidione
Sodium salt of 5,5-ethyl-methylallyl-2,4-thiazolidione
Sodium salt of 5,5-diallyl-2,4-thiazolidione These sodium salts are white solids, soluble in water, insoluble in ether, and their aqueous solutions are alkaline in reaction.

Ammonium and alkyl-amine salts

One molar proportion of any of the above contemplated disubstituted thiazolidiones is dissolved in or added to somewhat more than a molar proportion of an aqueous or alcoholic solution of concentrated ammnium or of alkyl amine, such for instance as mono- or di-methyl amine or mono- or di-ethyl amine, or of an alkanol amine, such as ethanolamine or isopropanolamine, or a half-molar proportion of an alkylene diamine, such as ethylene diamine. The amount of liquid used should be sufficient to insure complete reaction. The resulting salt crystallizes out, or is concentrated to solid form.

The general formula for such salts corresponds to that of the sodium salt, save that in place of Na the proper ammonium or substituted-ammonium radical appears.

We claim as our invention:

1. A 5,5-disubstituted-2,4-thiazolidione which is represented by the following formula:

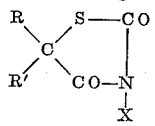

in which R and R' represent hydrocarbon groups of which at least one is a primary group, and each of which contains from 2 to 6 carbon atoms and has a carbon atom directly attached to the methylene carbon of the thiazolidione nucleus and to not more than two other carbon atoms, and in which the sum of the carbon atoms of R and R' does not exceed 10; and X represents a member of the class consisting of hydrogen, an alkali metal, a stoichiometric equivalent of an alkaline-earth metal, ammonium, mono-alkyl ammonium, dialkyl ammonium, alkanol ammonium, and an equivalent of an alkylene diammonium.

2. A 5,5-disubstituted-2,4-thiazolidione which is represented by the following formula:

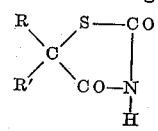

in which R and R' represent hydrocarbon groups of which at least one is a primary group, and each of which contains from 2 to 6 carbon atoms and has a carbon atom directly attached to the methylene carbon of the thiazolidione nucleus and to not more than two other carbon atoms, and in which the sum of the carbon atoms of R and R' does not exceed 10.

3. A 5,5-disubstituted-2,4-thiazolidione which is represented by the following formula:

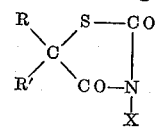

in which R and R' represent identical primary hydrocarbon groups each of which contains from 2 to 5 carbon atoms and has a carbon atom directly attached to the methylene carbon of the thiazolidione nucleus and to not more than two other carbon atoms; and X represents a member of the class consisting of hydrogen, an alkali metal, a stoichiometric equivalent of an alkaline-earth metal, ammonium, mono-alkyl ammonium, dialkyl ammonium, alkanol ammonium, and a stoichiometric equivalent of an alkylene diammonium.

4. A 5,5,-disubstituted-2,4-thiazolidione which is represented by the following formula:

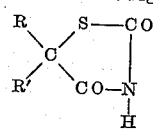

in which R and R' represent identical primary hydrocarbon groups each of which contains from 2 to 5 carbon atoms and has a carbon atom directly attached to the methylene carbon of the thiazolidione nucleus and to not more than two other carbon atoms.

5. A 5,5-disubstituted-2,4-thiazolidione which is represented by the following formula:

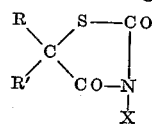

in which R and R' represent unlike hydrocarbon groups of which at least one is a primary group, and each of which contains from 2 to 6 carbon atoms and has a carbon atom directly attached to the methylene carbon of the thiazolidione nucleus and to not more than two other carbon atoms, and in which the sum of the carbon atoms of R and R' does not exceed 10; and X represents a member of the class consisting of hydrogen, an alkali metal, a stoichiometric equivalent of an alkaline-earth metal, ammonium, mono-alkyl ammonium, dialkyl ammonium, alkanol ammonium, and a stoichiometric equivalent of an alkylene diammonium.

6. A 5,5-disubstituted-2,4-thiazolidione which is represented by the following formula:

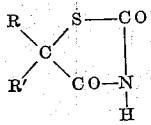

in which R and R' present unlike hydrocarbon groups of which at least one is a primary group, and each of which contains from 2 to 6 carbon atoms and has a carbon atom directly attached to the methylene carbon of the thiazolidione nucleus and to not more than two other carbon atoms, and in which the sum of the carbon atoms of R and R' does not exceed 10.

7. The process of producing a 5,5-disubstituted-2,4-thiazolidione in which the two substituent groups are hydrocarbon groups of which at least one is a primary group, and each of which contains from 2 to 6 carbon atoms and has a carbon atom directly attached to the methylene carbon of the thiazolidione nucleus and to not more than two other carbon atoms, and the sum of the carbon atoms of the two substituents does not exceed 10, which consists in treating the corresponding 5,5-disubstituted-2-imino-4-thiazolidione with an acid to remove the imino group.

8. A 5,5-disubstituted-2,4-thiazolidione as set forth in claim 5, in which R is the ethyl group.

9. A 5,5-disubstituted-2,4-thiazolidione as set forth in claim 6, in which R is the ethyl group.

10. A 5,5-disubstituted-2,4-thiazolidione as set forth in claim 5, in which R' contains 5 carbon atoms.

11. A 5,5-disubstituted-2,4-thiazolidione as set forth in claim 6, in which R' contains 5 carbon atoms.

12. A 5,5-disubstituted-2,4-thiazolidione as set forth in claim 5, in which R is the ethyl group and R' contains 5 carbon atoms.

13. A 5,5-disubstituted-2,4-thiazolidione as set forth in claim 6, in which R is the ethyl group and R' contains 5 carbon atoms.

14. A 5,5-disubstituted-2,4-thiazolidione as set forth in claim 5, in which R' is the 1-methyl-butyl group.

15. A 5,5-disubstituted-2,4-thiazolidione as set forth in claim 6, in which R' is the 1-methyl-butyl group.

16. A 5,5-disubstituted-2,4-thiazolidione as set forth in claim 5, in which R is the ethyl group and R' is the 1-methyl-butyl group.

17. A 5,5-disubstituted-2,4-thiazolidione as set forth in claim 6, in which R is the ethyl group and R' is the 1-methyl-butyl group.

18. A 5,5-disubstituted-2,4-thiazolidione as set forth in claim 5, in which R' contains 4 carbon atoms.

19. A 5,5-disubstituted-2,4-thiazolidione as set forth in claim 6, in which R' contains 4 carbon atoms.

20. A 5,5-disubstituted-2,4-thiazolidione as set forth in claim 5, in which R is the ethyl group and R' contains 4 carbon atoms.

21. A 5,5-disubstituted-2,4-thiazolidione as set forth in claim 6, in which R is the ethyl group and R' contains 4 carbon atoms.

22. A 5,5-disubstituted-2,4-thiazolidione as set forth in claim 5, in which R' is the secondary-butyl group.

23. A 5,5-disubstituted-2,4-thiazolidione as set forth in claim 6, in which R' is the secondary-butyl group.

24. A 5,5-disubstituted-2,4-thiazolidione as set forth in claim 5, in which R is the ethyl group and R' is the secondary-butyl group.

25. A 5,5-disubstituted-2,4-thiazolidione as set forth in claim 6, in which R is the ethyl group and R' is the secondary-butyl group.

26. A 5,5-disubstituted-2,4-thiazolidione as set forth in claim 3, in which R and R' are both ethyl groups.

27. A 5,5-disubstituted-2,4-thiazolidione as set forth in claim 4, in which R and R' are both ethyl groups.

28. The compound of the formula

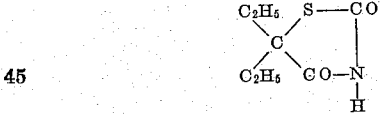

of melting point 78–80° C.

29. 5,5'-ethyl-(n-propyl)-2,4-thiazolidione.

30. 5,5-diallyl-2,4-thiazolidione.

HORACE A. SHONLE.
WILBUR J. DORAN.

CERTIFICATE OF CORRECTION.

Patent No. 2,255,903. September 16, 1941.

HORACE A. SHONLE, ET AL.

It is hereby certified that error appears in the printed specification of the above numbered patent requiring correction as follows: Page 1, first column, line 5, after the word "compounds" insert a comma; page 2, first column, line 66, for "butyl-2" read --butyl)-2--; and second column, lines 41 to 45 inclusive, for that portion of the formula reading "CO-H" read
$$\begin{matrix} | \\ H \end{matrix}$$
--CO-N--; page 4, first column, line 32, for "choride" read --chloride--;
$$\begin{matrix} | \\ H \end{matrix}$$
page 5, first column, line 9, in the formula, for "$R_1$" read --R'--; and second column, line 11, claim 1, for "an" first occurrence, read --a stoichiometric--; page 6, first column, line 15, claim 6, for "present" read --represent--; and that the said Letters Patent should be read with this correction therein that the same may conform to the record of the case in the Patent Office.

Signed and sealed this 18th day of November, A. D. 1941.

(Seal)

Henry Van Arsdale,
Acting Commissioner of Patents.